(12) United States Patent
Jowett et al.

(10) Patent No.: US 12,395,465 B2
(45) Date of Patent: Aug. 19, 2025

(54) METHOD AND SYSTEM OF SECURING VPN COMMUNICATIONS

(71) Applicant: Microsoft Technology Licensing, LLC, Redmond, WA (US)

(72) Inventors: Alan Thomas Gavin Jowett, Eagle Mt., UT (US); Andrew Albert Hodgkinson, Highland, UT (US); Lance Vernon Crandall, Saratoga Springs, UT (US); Jeffrey Scott Pinkston, Draper, UT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/627,243

(22) Filed: Apr. 4, 2024

(65) Prior Publication Data

US 2024/0250934 A1 Jul. 25, 2024

Related U.S. Application Data

(62) Division of application No. 16/916,354, filed on Jun. 30, 2020, now Pat. No. 11,979,376.

(51) Int. Cl.
*G06F 21/45* (2013.01)
*H04L 9/32* (2006.01)
*H04L 9/40* (2022.01)
*G06F 21/40* (2013.01)
*G06F 21/62* (2013.01)

(52) U.S. Cl.
CPC ........ *H04L 63/0272* (2013.01); *H04L 9/3213* (2013.01); *H04L 63/0435* (2013.01); *H04L 63/0876* (2013.01); *H04L 63/20* (2013.01)

(58) Field of Classification Search
None
See application file for complete search history.

(56) References Cited

U.S. PATENT DOCUMENTS

| 11,184,157 B1* | 11/2021 | Gueron | H04L 9/14 |
| 2007/0189528 A1* | 8/2007 | Ueda | H04W 12/033 380/44 |
| 2008/0267407 A1* | 10/2008 | Vanderveen | H04W 12/0431 380/277 |

(Continued)

OTHER PUBLICATIONS

Implementation of Node Authentication for WSN using Hash Chains. Moon. Elsevier. (Year: 2016).*

(Continued)

*Primary Examiner* — Venkat Perungavoor
(74) *Attorney, Agent, or Firm* — Workman Nydegger (57) ABSTRACT

A method of and system for utilizing an access token to authenticate a client device for accessing a resource server include generating a session key for a communication session between the device and a resource server, deriving a nonce from the session key, and transmitting a request to an identity platform for authenticating the device to access the resource server, where the request includes the nonce. Upon confirmation of authentication, the method and system may include receiving an access token from the identity platform, the access token including information that confirms authentication of the device, and transmitting the access token to the resource server to enable access to the resource server, where the access token includes the nonce.

20 Claims, 7 Drawing Sheets

(56) References Cited

U.S. PATENT DOCUMENTS

| | | | | |
|---|---|---|---|---|
| 2010/0088236 A1* | 4/2010 | Karabulut | ............ | G06F 21/335 |
| | | | | 705/59 |
| 2015/0074407 A1* | 3/2015 | Palmeri | ............... | H04L 67/1095 |
| | | | | 713/171 |
| 2015/0188899 A1* | 7/2015 | Bakar | ................... | H04L 9/3247 |
| | | | | 726/10 |
| 2015/0215128 A1* | 7/2015 | Pal | ..................... | H04L 63/0815 |
| | | | | 713/155 |
| 2016/0330025 A1* | 11/2016 | Gouget | .................... | H04L 9/00 |
| 2021/0226959 A1* | 7/2021 | Griggio | ............... | H04L 63/0861 |
| 2021/0409378 A1* | 12/2021 | Jowett | .................... | H04L 63/08 |

OTHER PUBLICATIONS

A Polynomial Subset-Based Efficient Multi-Party Key Management System for Lightweight Device Networks. Mahmood. Sensors. (Year: 2017).*

First Examination Report Received for Indian Application No. 202217073818, mailed on Jul. 8, 2025, 07 Pages.

* cited by examiner

METHOD AND SYSTEM OF SECURING VPN COMMUNICATIONS

TECHNICAL FIELD

This disclosure relates generally to securely connecting to a virtual private network (VPN), and more particularly, to a method and system of using token-based authentication to secure VPN tunnels.

BACKGROUND

A VPN is often used to enable users to transmit data from their devices to a private network across shared or public networks as if their devices were directly connected to the private network. This may enable applications running across the VPN to benefit from the security and management of the private network. To ensure security and proper authentication, VPN servers often perform authentication functions to authorize a user to access the VPN server. This may require the VPN server to spend significant memory and processor resources on the authentication functions. Occasionally, in addition to being an authorized user, other conditions must be satisfied to access the VPN server. Some of these conditions may relate to device states. To ensure these conditions are met, the VPN server may query the device to verify one or more states of the device. However, the process of querying various devices to verify their device state may require considerable bandwidth and processor resources.

Hence, there is a need for an improved method and system of authenticating VPN users and/or securing VPN tunnels.

SUMMARY

To address these issues and more, in one general aspect, described herein is a device having a processor and a memory in communication with the processor wherein the memory stores executable instructions that, when executed by the processor, cause the device to perform multiple functions. The functions may include generating a session key for a communication session between the device and a resource server, deriving a nonce from the session key, transmitting a request to an identity platform to authenticate the device for accessing the resource server, the request including the nonce, upon confirmation of authentication, receiving an access token from the identity platform, the access token including information that confirms authentication of the device, and transmitting the access token to the resource server to enable access to the resource server, wherein the access token includes the nonce.

In yet another general aspect, the instant application describes a method for generating an access token for providing access to a resource server. The method may include receiving a request from a device to provide an access token to the device, the access token for use in accessing the resource server, the request including a nonce derived from a session key generated for a communication session between the device and the resource server, determining if the device is authorized to access the resource server, responsive to determining that the device is authorized to access the resource server, generating the access token, including the nonce in the access token, and transmitting the access token to the device.

In a further general aspect, the instant application describes a non-transitory computer readable medium on which are stored instructions that when executed cause a programmable device to generate a session key for a communication session between the programmable device and a resource server, deriving a nonce from the session key, transmit a request to an identity platform to authenticate the programmable device for accessing the resource server, the request including the nonce, upon confirmation of authentication, receive an access token from the identity platform, the access token including information that confirms authentication of the programmable device, and transmit the access token to the resource server to enable access to the resource server, wherein the access token includes the nonce.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

VPN channels are often used to securely and privately connect a personal client device to an outside network. To use a VPN service, however, the user has to first provide authenticating information that ensures the user is authorized to access the VPN. Traditionally, VPN servers perform the authentication and authorization procedures themselves. This may involve multiple data exchanges with the client device and/or remote authentication services such as remote authentication dial-in user service (RADIUS). This process often requires use of memory, processor and/or bandwidth resources.

In addition to requiring the client device to be associated with an authorized user, some services (e.g., a VPN service) may expect certain conditions to be satisfied to allow continued access to the service. In some cases, these conditions relate to devices' states, such as having a specific operating system, not being jailbroken and the like. These conditions are referred to as conditional access policies in this disclosure. To ensure the conditional access policies are met, the VPN server generally queries the device to identify the latest device states. This is performed after the user has been authenticated. However, device states may change during the length of a session. To enable detection of device state changes, VPN servers often query each device during the length of the session to ensure the policies continue being met. This may require substantial amounts of hardware and/or software resources. Because of the amount of resources required to query each client device to ensure conditional access policies are met, most VPN servers query each device occasionally (e.g., once every hour). This naturally may result in slow responses to changes in device states since a period of time may pass between when the device state changes and when the VPN server identifies the changed state. Moreover, having the VPN server verify compliance with conditional access policies may result in degraded end-user experiences. Thus, having the VPN server itself verify compliance with conditional access policies may not only require significant bandwidth, memory and processor resources, but may also result in slow responses to changed states, poor performance and/or degraded user experiences.

To address these technical problems and more, in an example, this description provides a technical solution for efficiently authenticating a resource server user by utilizing a token issued by an identity platform. The identify platform for authenticating the user may be separate from the resource server (e.g., a VPN server). The identity platform may perform the required authentication procedures, and once the user is authenticated, issue an access token for the user. The access token may include information identifying the user as well as information verifying that the token was issued by the appropriate identity platform. The access token may then be transmitted to the resource client (e.g., a VPN client), which may use the access token to access the resource server. In this manner, the process of authenticating the user is performed by an entity other than the resource server, thus reducing the amount of processor, memory and bandwidth resources used by the resource server. Furthermore, by using a token, the process of authentication becomes simpler and more efficient.

In some implementations, when conditional access policies are required to be met to access a resource server, the process of ensuring these policies are satisfied may be performed as part of the authentication process. The authentication process may involve the identify platform and/or a verification platform verifying the conditional access policies before an access token is issued. In one implementation, the access token may include an indication specifying that the device is compliant with the conditional access policies. As a result, the technical solution provides an improved method of both authenticating a resource server user and ensuring the user's client device is compliant with conditional access policies. The improved method increases efficiency and saves computer resources.

Tokens used to access a transport layer security (TLS) session may be subject to replay attacks. For example, tokens from a client device may be deduced and used by a different device to access a VPN server. To prevent this, for some implementations, this description provides a technical solution for increasing security features provided by an access token by adding a cryptographic indication (e.g., a nonce) to the access token. To create the cryptographic indication, a session master secret may first be generated for each session. The session master secret may then be manipulated to generate a cryptographic indication that is associated with the specific session. This may involve generating a hash of the session master secret. In this manner, the cryptographic indication may be computed independently by both the client and the resource server and cannot be deduced by an external attacker. As a result, attempts to use the access token outside of the channel fail as the cryptographic indication the resource server computes will not match the cryptographic indication in the deduced token. Thus, the technical solution provides an efficient mechanism to provide additional security when performing authenticating procedures remotely.

As will be understood by persons of skill in the art upon reading this disclosure, benefits and advantages provided by such technical solutions can include, but are not limited to, a solution to the technical problem of inefficient authorization of resource server users and inefficient verification of conditional access policy compliance. Moreover, benefits and advantages provided by such technical solutions include providing additional security by efficiently preventing unauthorized use of access tokens. The benefits provided by these solutions include improving resource server efficiency, improving user experience and increasing security.

Figure 1:
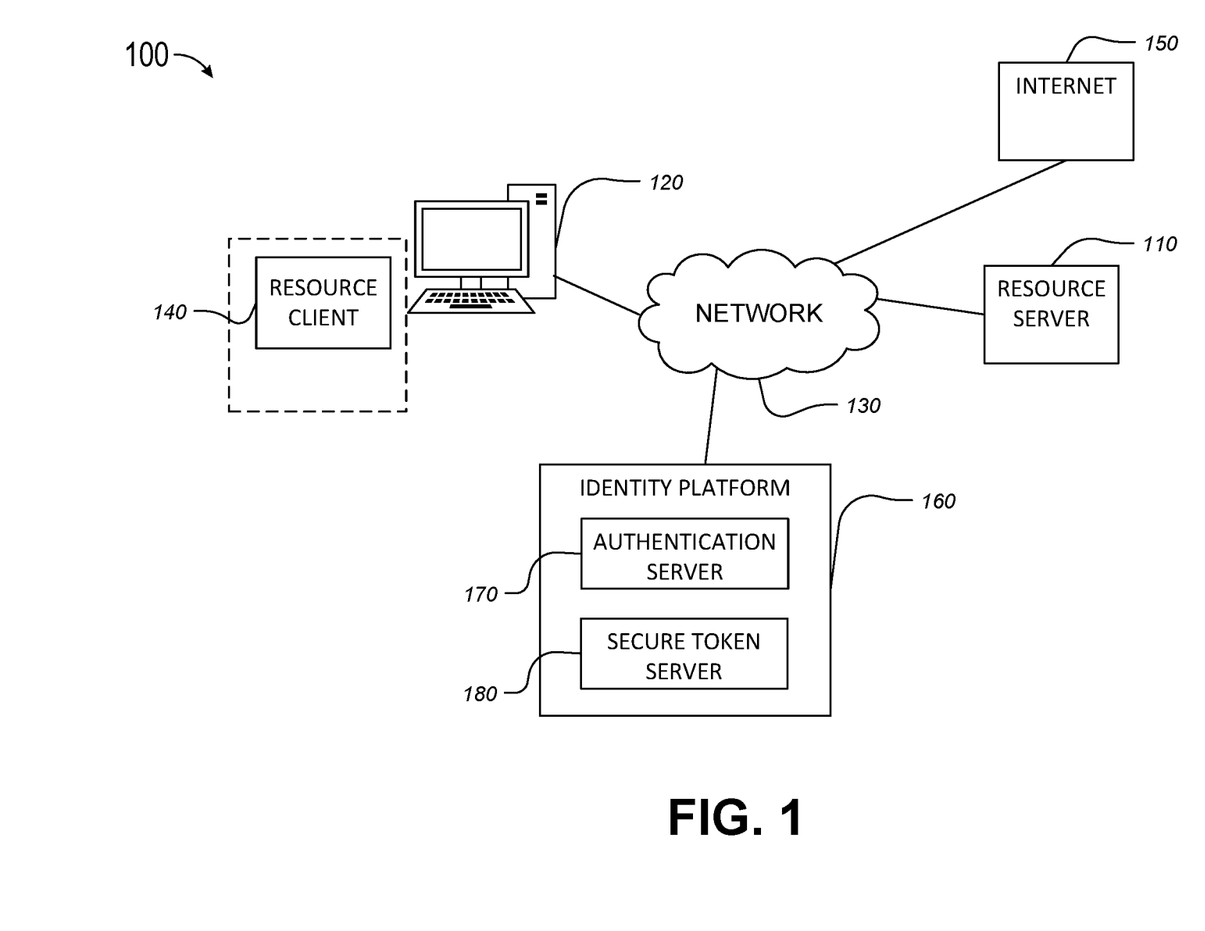
FIG. 1 depicts an example system upon which aspects of this disclosure may be implemented.

FIG. 1 illustrates an example system 100, upon which aspects of this disclosure may be implemented. The system 100 may include a resource server 110 which may be a VPN server that enables VPN communications between a client device 120 and a public network or the Internet 150. The resource server 110 may operate to establish a tunnel (e.g., a VPN tunnel) between a resource client 140 and the resource server 110. Data going through this tunnel may be encrypted to provide privacy and/or security. As a result, the resource server 110 may provide secure and private communications between client devices such as the client device 120 and the Internet 150. The resource server 110 may operate as a shared resource server accessible by various computer client devices such as client device 120.

The network 130 may be a wired or wireless network(s) or a combination of wired and wireless networks that connect one or more elements of the system 100. The client device 120 may be any type of device that can receive input from a user and communicate with the network 130 to send and receive data. Such client devices may include personal or handheld computing devices having or being connected to input and output elements. For example, client device 120 may be one of: a mobile telephone; a smart phone; a tablet; a phablet; a smart watch; a wearable computer; a personal computer; a desktop computer; a laptop computer; a gaming device/computer; a television; a thick client; a thin client; a browser-based client and the like. This list is for example purposes only and should not be considered as limiting. The internal hardware structure of a client device is discussed in greater detail in regard to FIGS. 5 and 6.

In some implementations, the client device 120 includes the resource client 140 (e.g., a VPN client). The resource client 140 may be an application (e.g., a software program) installed on the client device 120 to establish and manage a connection between the resource client 140 and the resource server 110. As such, the resource client 140 may be provided to offer access to the resources of the resource server 110 (e.g., VPN services). For example, a VPN client is often provided on the client device 120 to establish a VPN connection with a VPN server and manage the VPN tunnel for VPN communications with the VPN server. In some implementations, the resource client 140 operates in the background automatically. Alternatively, and/or additionally, the resource client 140 may provide one or more user interfaces (UIs) that enable a user to interact with and/or configure the resource client 140.

To ensure that a user is authorized to use the resource server 110 and/or confirm the client device 120 is communicating with the correct resource server 110, authentication is required before a tunnel can be established for communication. To avoid the need for the resource server 110 itself to perform the authentication operations, the technical solution described in the present application provides a token-based authentication mechanism in which the token is generated by an entity that is independent from the resource server 110. In some implementations, this is achieved by utilizing an identity platform 160. The identity platform 160 may be an application (e.g., software program) that provides client authentication, identity and/or access management. The identity platform 160 may include an authentication server 170, a secure token server 180, and/or one or more application programming interfaces (APIs) to manage user identities and authorizations. In some implementations, the identity platform 160 also includes a web interface (not shown) to enable administrators and/or users to interact with the identity platform 160.

The identity platform 160 may help the client device 120 add identity and access management functionality to the resource client 140. As such, the identity platform 160 may receive a request from the resource client 140 to authenticate the client device 120 for accessing the resource server 110. In response, the identity platform 160 may perform authentication operations to authenticate the client device 120. In some implementation, authenticating the client device 120 may involve communicating with the authentication server 170. The authentication server 170 may provide one or more UIs that enable a user to interact with the authentication server 170 to provide authentication information. For example, the authentication server 170 may provide one or more UIs to allow the user to provide logging information (e.g., username, password, and the like). Once the authentication information (e.g., logging information, device identification information and the like) is received, the authentication server 170 may determine whether the user is authorized to access the resource server 110. This may be done by comparing the received authentication information with authentication information stored in a user data store (e.g., a user authentication database) to confirm the received information matches the stored information. Once the user and/or the client device 120 is authenticated, then the authentication server 170 may transmit data informing the identity platform 160 of the authentication. The identity platform 160 may in turn generate the access token. In some implementations, the access token is generated by the secure token server 180. Alternatively, the authentication server 170 may itself generate the access token and transmit it to the identity platform 160. In such an implementation, the identity platform 160 may be responsible for communicating with the authentication server 170 and/or for storing and managing access tokens. The identity platform 160 may transmit the access token to the resource client 140 to be used in communications with the resource server 110. In some implementations, the identity platform 160 is stored on a server and may be accessed via the network 130 by one or more client devices. Alternatively, and/or additionally, the identity platform 160 may be stored and/or may operate from the client device 120.

In some implementations, in addition to providing identity and access management functionality, the identity platform 160 verifies compliance with conditional access policies. For example, when the resource server 110 requires compliance with certain conditional access policies, these policies may be communicated to the identity platform 160. The identity platform 160 may then query the client device 120 or a device management provider (not shown) managing the client device 120 for status of states relating to the conditional access policies. In response to receiving the status, the identity platform 160 may examine the status to confirm compliance. For example, the identity platform 160 may request that the client device 120 provide information about the latest operating system used by the client device 120. In response, the client device 120 may identify and send information identifying the latest operating system to the identity platform 160. The identity platform 160 may compare the identified operating system to the conditional access policies to determine if the identified operating system complies with the requirements. Thus, instead of the resource server 110 having to perform post-authentication compliance verification operations, the identity platform 160 may work directly with the client device 120 and/or client device's device management provider to obtain the latest device states. Once compliance is confirmed, the identity platform 160 may include an indication in the access token identifying that the device is compliant with the conditional access policies.

The identity platform 160 may in turn generate the access token, once confirmation of authentication is received from the authentication server 170. Alternatively, the authentication server 170 may itself generate the access token and transmit it to the identity platform 160. In such an implementation, the identity platform 160 may be responsible for communicating with the authentication server 170 and/or for storing and managing access tokens.

Figure 2A:
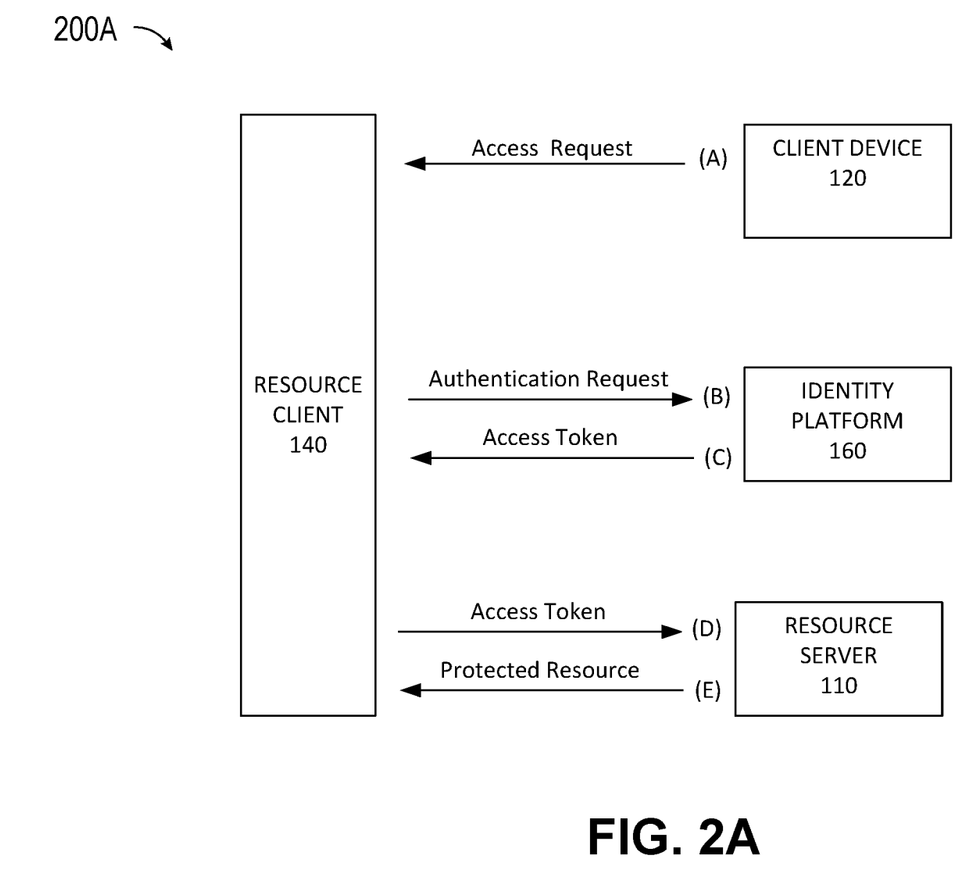
FIGS. 2A-2B depict simplified example arrangement of data flows for providing an access token to authenticate a client device.

FIG. 2A illustrates a simplified example arrangement of data flow for providing an access token to authenticate a client device. As depicted, the data flow 200A may begin when the client device 120 transmits an access request to the resource client 140. This may be initiated, for example, by a user of the client device 120 launching the resource client 140. Alternatively, it may occur when the user utilizes a UI feature provided by the resource client 140 to request access to the resource server 110. In another implementation, the process may be initiated in the background without direct user action. For example, it may be initiated when a web browser is opened.

Once the access request is received, the resource client 140 may transmit an authentication request to the identity platform 160. Upon confirming that the user is authorized to access the resource server 110, the identity platform 160 may transmit an access token to the resource client 140. The access token may include information confirming that the user is authenticated and authorized to access the resource server 110. Furthermore, when compliance with conditional access policies is required, the access token may include information confirming that the client device 120 meets the conditional access policy requirements. For example, flag included in the access token may be checked if the client device 120 meets the condition access policy requirements.

In some implementations, the access token may include one or more claims. One of the one or more claims may provide an indication that the user is authenticated and authorized to access the resource server 110 (e.g., the client device is an authorized device). Another one of the claims may provide an indication that that the client device 120 complies with the conditional access policy requirements.

This access token may then be transmitted by the resource client 140 to the resource server 110. The resource server 110 may examine the access token to ensure it includes information verifying that the user/client device 120 is authorized to access the resource server 110 and is in compliance with any conditional access policies, if required. If the access token includes the required information (e.g., the required claims), the resource server 110 may grant access to the protected resources (e.g., provide the protected tunnel for secure and/or private communications with the Internet).

The process of authenticating and verifying compliance with conditional access policies by using an access token improves system efficiency and may also improve user experience. However, access tokens can be subject to replay attacks where an attacker can spoof and replay the token. To prevent this, in some implementations, a nonce derived by the client device 120 may be included in the access token. Nonce as used herein may refer to a random or pseudo-random number issued by to ensure that communications cannot be reused in replay attached. The nonce may also be independently derived by the resource server 110 to ensure authenticity. However, the nonce is not directly transmitted by either the client device 120 or the resource server 110 and as such cannot be deduced by an external attacker.

Figure 2B:
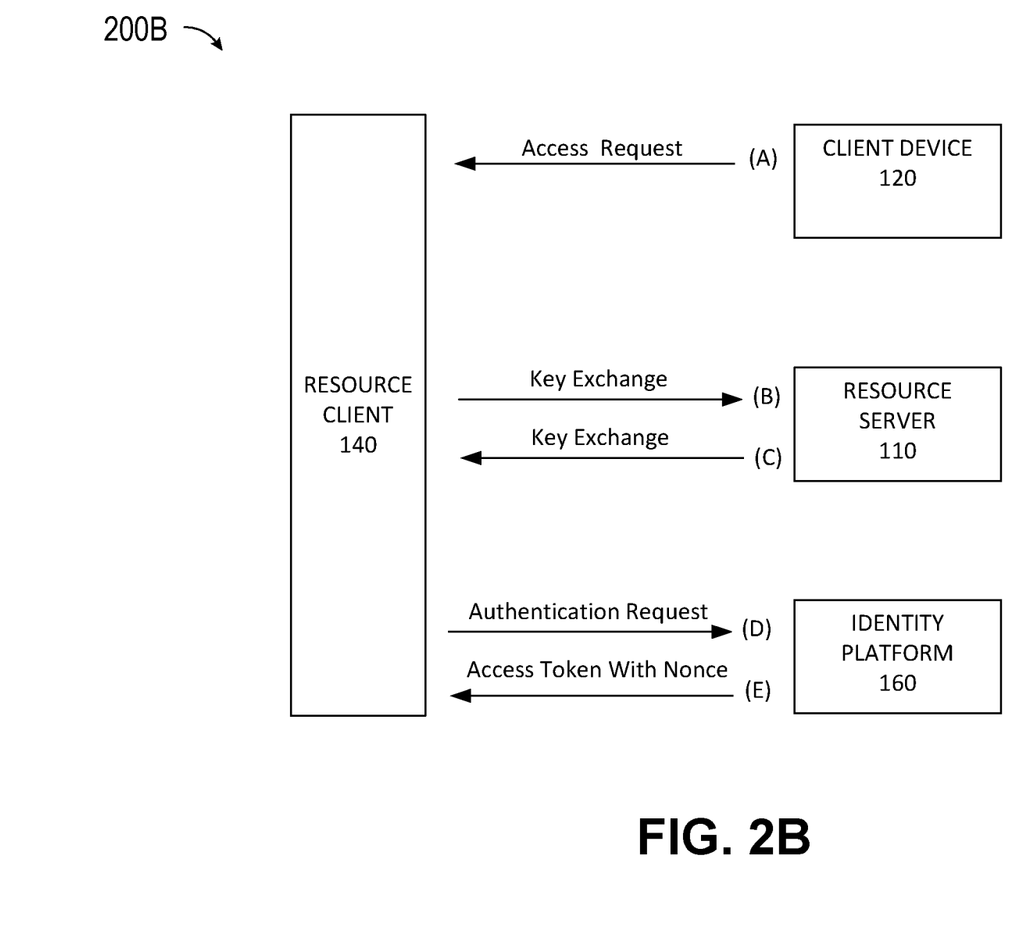

FIG. 2B illustrates a simplified example arrangement of data flow for providing an access token which includes a nonce. As depicted, the data flow 200B may begin when the client device 120 transmits an access request to the resource client 140. This may be initiated, in a similar manner as discussed above with respect to FIG. 2A. For example, the process may be initiated by a user of the client device 120 launching the resource client 140.

Once the access request is received, the resource client 140 may begin the process of key exchange operations with the resource server 110. The key exchange operations may involve first sending a request to the resource server 110 to begin communications. As part of the request to begin communications, the resource client 140 may securely transmit part of a cryptographic session key to the resource server 110. In response, the resource server 110 may transmit a different part of the cryptographic session key to the resource client 140. In some implementations, this is performed via a Diffie-Hellman key exchange operation. The key exchange may involve perfect forward secrecy, where even if the key is comprised, only a small portion of the key may be exposed. In this manner, the resource server 110 may have one part of the key and the resource client 140 may have a different part of the key. After the exchange, both the resource server 110 and the resource client 140 may have the two portions of the key that can make up the complete key. The two separate portions may then be used by both the resource server 110 and the resource client 140 to separately generate the complete key. In this manner, only the resource server 110 and the resource client 140 may have the complete key. This complete key is referred herein as the master session key.

In some implementations, the master session key may include information about the active communication session. That is because communication sessions (e.g., a TLS session) involve states that are generated on both sides of the session (e.g., on the client side and the server side). These states may be included in the exchanged key such that the key is tied to the active communication session. In this manner, even if the master session key is compromised, a different device will not be able to successfully replay the token because the session information included in the master session key will be incorrect.

After the key exchange communications, the resource client 140 may create the master session key from the information exchanged with the resource server 110. Once the master session key is generated, the resource client 140 may derive a nonce from the master session key. In some implementations, the nonce is a hash of the master session key. This may provide an added layer of security such that the master session key cannot be spoofed during communications. The generated nonce may only be used for the current session as it includes information that ties the nonce to the current session.

Once the nonce is generated, an authentication request may be transmitted from the resource client 140 to the identity platform 160 to provide an access token. This request may include the nonce. Once received, the identity platform 160 may include the nonce in the access token it generates. In some implementations, the nonce may be included as one of one or more indications that are included in the access token. The resulting access token with the nonce may then be transmitted to the resource client 140.

Upon receipt, the resource client 140 may transmit the access token which includes the nonce to the resource server 110 to begin communications. In response, the resource server 110 may create a nonce derived from the master session key it generated and compare this nonce to the nonce included in the access token. If the nonce provided in the access token and the nonce generated by the resource server 110 match, then the resource server 110 determines that the access token is a valid access token from an authorized user. This proves that the token has not been replayed outside of the original session. As a result, the resource server 110 can provide access to the resource (e.g., VPN tunnel) securely. This increases security and may prevent external attacks, when an access token is used.

Figure 3:
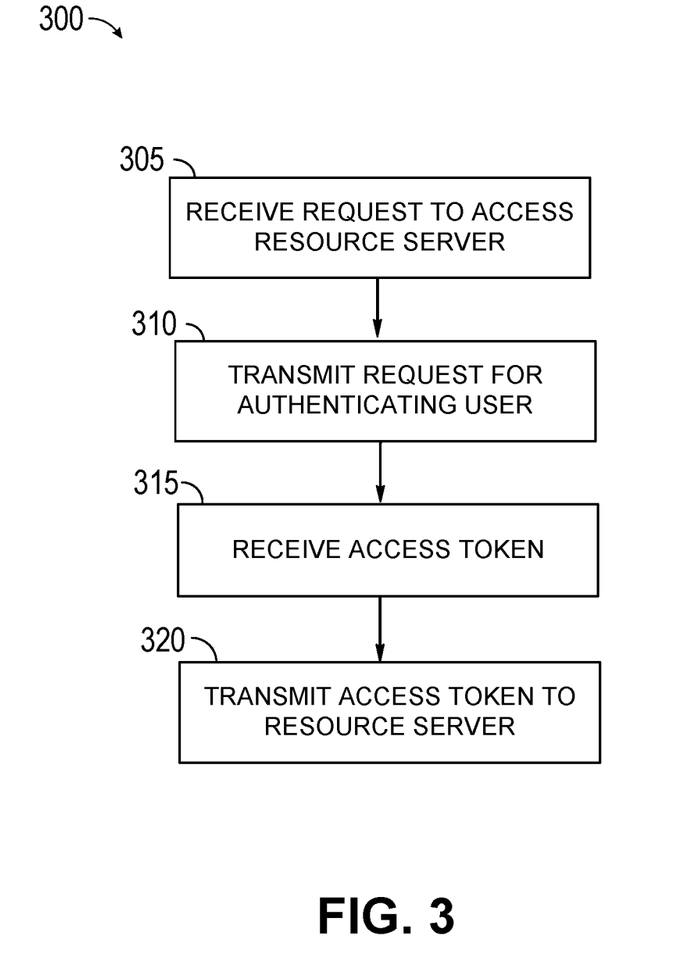
FIG. 3 is a flow diagram depicting an example method for requesting and receiving an access token to authenticate a client device to a resource server.

FIG. 3 is a flow diagram depicting an example method 300 for requesting and receiving an access token to authenticate a client device to access a resource server. In some implementations, the steps of method 300 are performed by a resource client such as the resource client 140 of FIG. 1. At 305, method 300 may begin by receiving a request to access a resource server. This may be initiated when a request to launch the resource client is received. Alternatively, it may occur when the user utilizes a UI feature provided by the resource client to request access to the resource server and/or a request to access a network is received.

Once the request to access the resource server is received, method 300 may proceed to transmit a request for authentication, at 310. This may occur, for example, by the resource client sending an authentication request to an identity platform. In implementations where a nonce is used for added security, the nonce may be transmitted as part of the authentication request. The identity platform may, in turn, perform the authentication operations required to authenticate the client device/user. Once the identity platform confirms that the client device/user is authorized to access the resource server, it may transmit an access token to the resource client. Thus, method 300 may receive an access token, at 315. The access token may be received from the identify platform and may include information confirming authentication and/or compliance with conditional access policies. Furthermore, the access token may include a nonce derived from a master session key for the current session. After receiving the access token, method 300 may proceed to transmit the access token to the resource server, at 320. This may enable the resource server to verify that the client device/user is authorized to access the resource server without having to perform authentication procedures itself.

Figure 4:
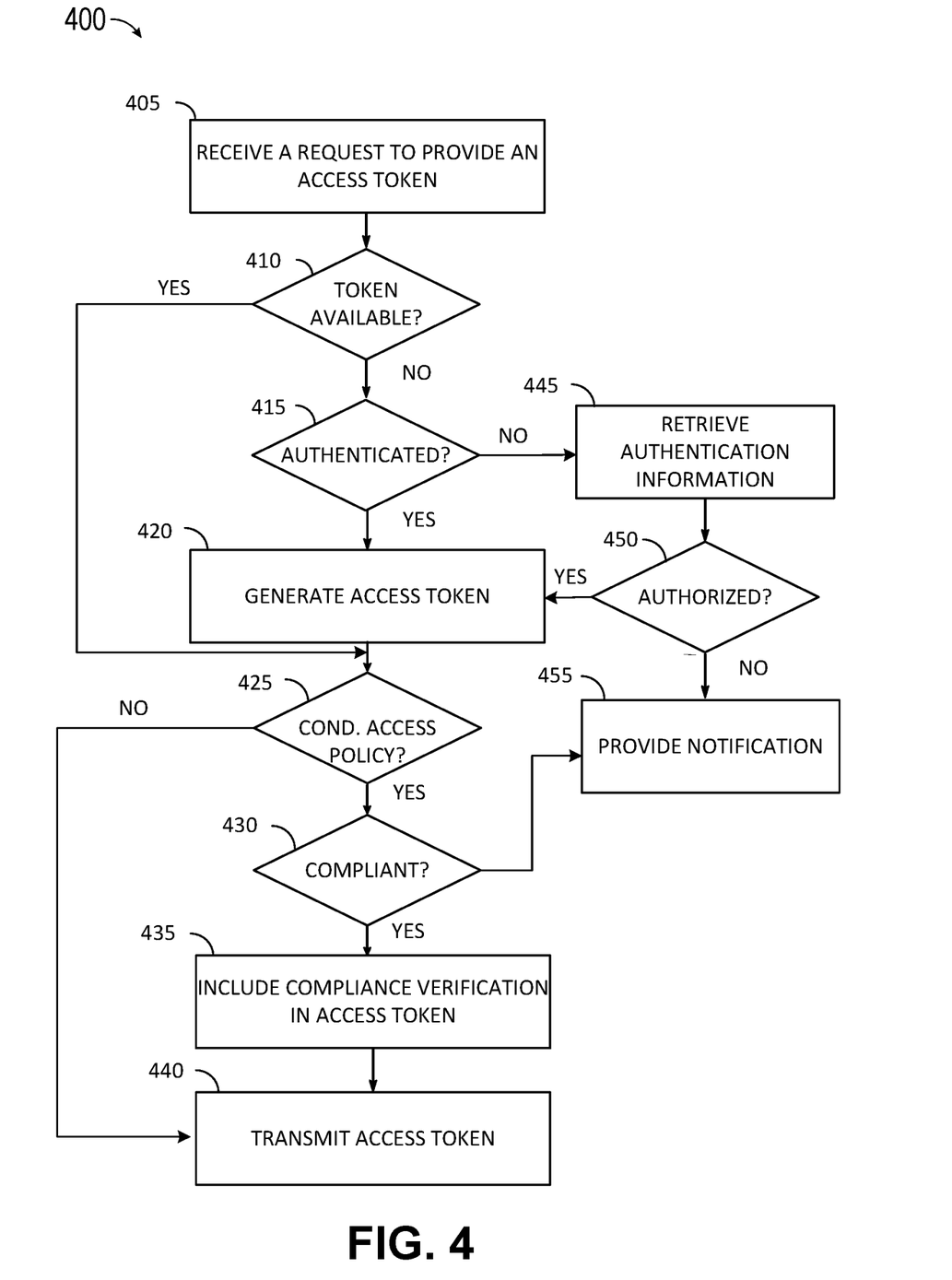
FIG. 4 is a flow diagram depicting an example method for generating an access token for authenticating a client device to access a resource server.

FIG. 4 is a flow diagram depicting an example method 400 for generating an access token for authenticating a client device to access a resource server. In some implementations, method 400 may be performed by an identity platform such as the identity platform 160 of FIG. 1 and/or by an authentication server such as the authentication server 170 of FIG. 1. At 405, method 400 may begin by receiving a request to provide an access token. This may occur when a resource client such as a VPN client transmits a request for an access token to authenticate the client device to the resource server. The request may be received via a network and may include information identifying the resource client and/or the client device from which the request is received. In some implementations, the request may also include a nonce derived from a master session key for the current session to be included in the access token.

Upon receiving the request, method 400 may proceed to determine if a valid access token is available for the client device identified in the request, at 410. This may occur, for example, when a request for an access token was received and an access token was generated for the client device within a recent predetermined time period (e.g., in the last hour). For example, there may be time limitations associated with the token, upon the expiration of which the token may be determined to become invalid. In some examples, an access token may only be valid for one hour. In other examples, the access token may be valid for 24 hours. Other configurations are also possible. For example, the validity of the access token may depend on other parameters in addition to or instead of time. In implementations where a nonce is used to increase security, once a valid access token is identified, the nonce may be added to the valid access token. This is because the nonce is associated with the active session and as such even if a valid access token is available, it may not have the correct nonce.

When it is determined that a valid access token is available for the client device (yes at 410), method 400 may proceed to step 425 to determine if compliance with conditional access policies is required, as discussed further below. When, however, it is determined that a valid access token is not available for the client device (no at 410), method 400 may proceed to determine if the client device has been authenticated, at 415. This may involve determining if a valid authorization grant has been generated and/or received for the client device. In some implementations, a valid authorization grant is generated once authentication information provided by the user of the client device and/or other identity information (e.g., device identity information) received from the resource client is examined against an authentication database to ensure the user is authorized to utilize the resource server. This may require that the user be a registered user of the resource server and/or be utilizing an authorized network (e.g., an authorized WiFi network). In some implementations, an authorization grant may expire after a predetermined time period to prevent the possibility of unauthorized use.

When it is determined that the client device/user is authenticated (e.g., a valid authentication grant is available) (yes at 415), method 400 may proceed to generate an access token, at 420. In some implementations, the access token is generated and operates in a similar manner as an OAuth and/or an OpenID Connect token. Thus, the token may be a security token generated and used to enable access. The access token may include identification information about the client device and/or user. For example, the access token may include username and/or password information. Furthermore, the access token may include verification evidence that shows the access token was issued by the identity platform. For example, the access token may include a cryptographic signature as evidence that it was generated by the proper identity platform. Moreover, the access token may include a nonce derived from a master session key for the current session to be included in the access token.

If it is determined, however, that the client device/user has not achieved authentication (e.g., a valid authentication grant is not available) (no at 415), method 400 may proceed to retrieve authentication information for the client device/user, at 445. This process may include transmitting a request for authentication to the authentication server, where the request includes information identifying the resource client and/or the client device. If identifying information is not available or is insufficient to authenticate the client device/user, the authentication server may provide a UI to enable the user to enter identification information such as a username and/or password. Alternatively, the identification information may be retrieved via identity federation. Once received, the identification information may be provided to the identity platform. In some implementations, the process of providing a UI to receive identification information and verifying the identification information is performed by the identity platform.

Upon retrieving the identification information, method 400 may proceed to examine the information against an authentication database to determine if the user is authorized to utilize the resource server, at 450. This may be performed by the authentication server. If the client device/user is identified as being authorized (yes at 450), method 400 may proceed to step 420 to generate an access token, as discussed above. When, however, it is determined that the client device/user is not authorized (no at 450), method 400 may proceed to provide notification to the resource client that the client device/user is not an authorized user, at 455. In response, the resource client may display a notification to the user notifying them that the authentication information they provided is incorrect, and may enable the user to enter alternative identification information.

After an access token has been generated, method 400 may proceed to determine if compliance with conditional access policies is required by the resource server, at 425. The conditional access policies may include compliance with specific device states such as not being a jailbroken device, having specific operation systems, being a managed device, and the like. These may be access policies that are set by an administrator, such as a VPN administrator, as prerequisites for utilizing the resource sever. When it is determined that compliance with conditional access policies is not required, method 400 may proceed to step 440 to transmit the generated access token to the resource client. If, however, it is determined that the client device is required to comply with conditional access policies (yes at 425), method 400 may proceed to determine if the conditional access policies are satisfied, at 430. This may involve querying the resource client and/or the client device's device management provider to determine one or more device states. The device states may then be transmitted to the identity platform to determine if the client device meets the requirements.

When it is determined that the device is compliant (yes at 430), method 400 may proceed to include device compliance verification in the access token, at 435. This information may be provided as an indication within the token. When device compliance is verified and the compliance verification information is included in the access token, method 400 may proceed to transmit that access token to the resource client, at 440. In an alternative implementation, compliance verification may not be included in the access token. Instead, compliance with the conditional access policies may be verified before the access token is generated. In such an implementation, the access token may be generated after it is verified that the client device satisfies the conditional access requirements. As result, generation of the access token itself may be an indication of compliance with conditional access policies.

If, however, it is determined that the device does not satisfy the conditional access requirements, method 400 may proceed to step 455 to provide a notification to the resource client. This may include transmitting notification information that notifies the user, authentication could not be granted because the device does not meet one or more conditional access policy requirements. In response, the resource client may display a notification to the user notifying them of the conditional access policy requirements.

Thus, in different implementations, a technical solution may be provided to enable utilizing an access token generated by an independent identity platform to authorize a client device to access a resource server such as a VPN server and/or verify compliance with conditional access policies of the resource server. To achieve this, the technical solution may utilize an identity platform that communicates with a resource client and/or a client device management provider to authenticate the user and ensure the client device complies with the conditional access policies. In this manner, verification of compliance with conditional access policies may be integrated into the authentication process. The identity platform may generate and transmit an access token that can be used to securely communicate with the resource server. Furthermore, the token may include a nonce of a master session key associated with the active session to increase security. This increase system efficiency for the resource server while improving user experience and increasing security.

Figure 5:
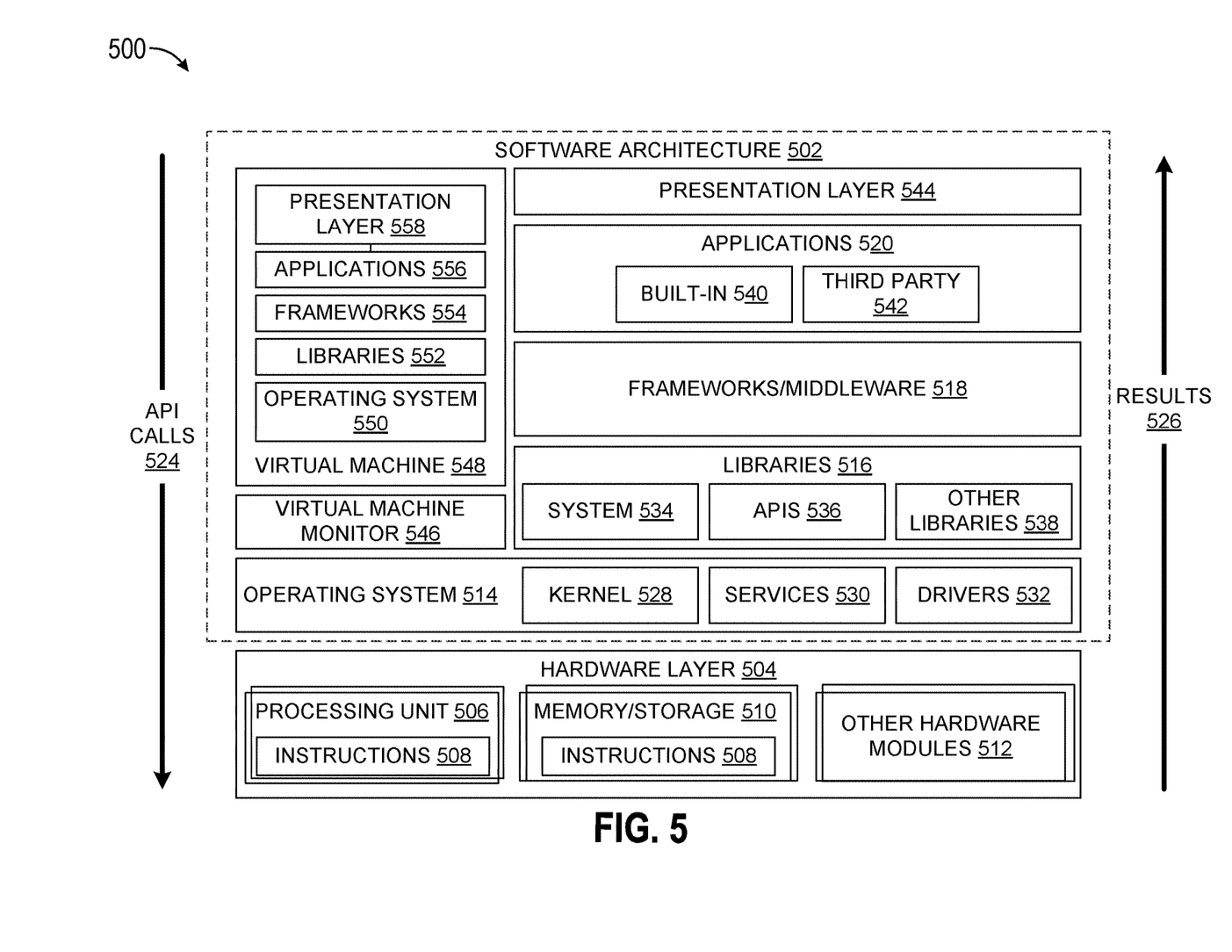
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
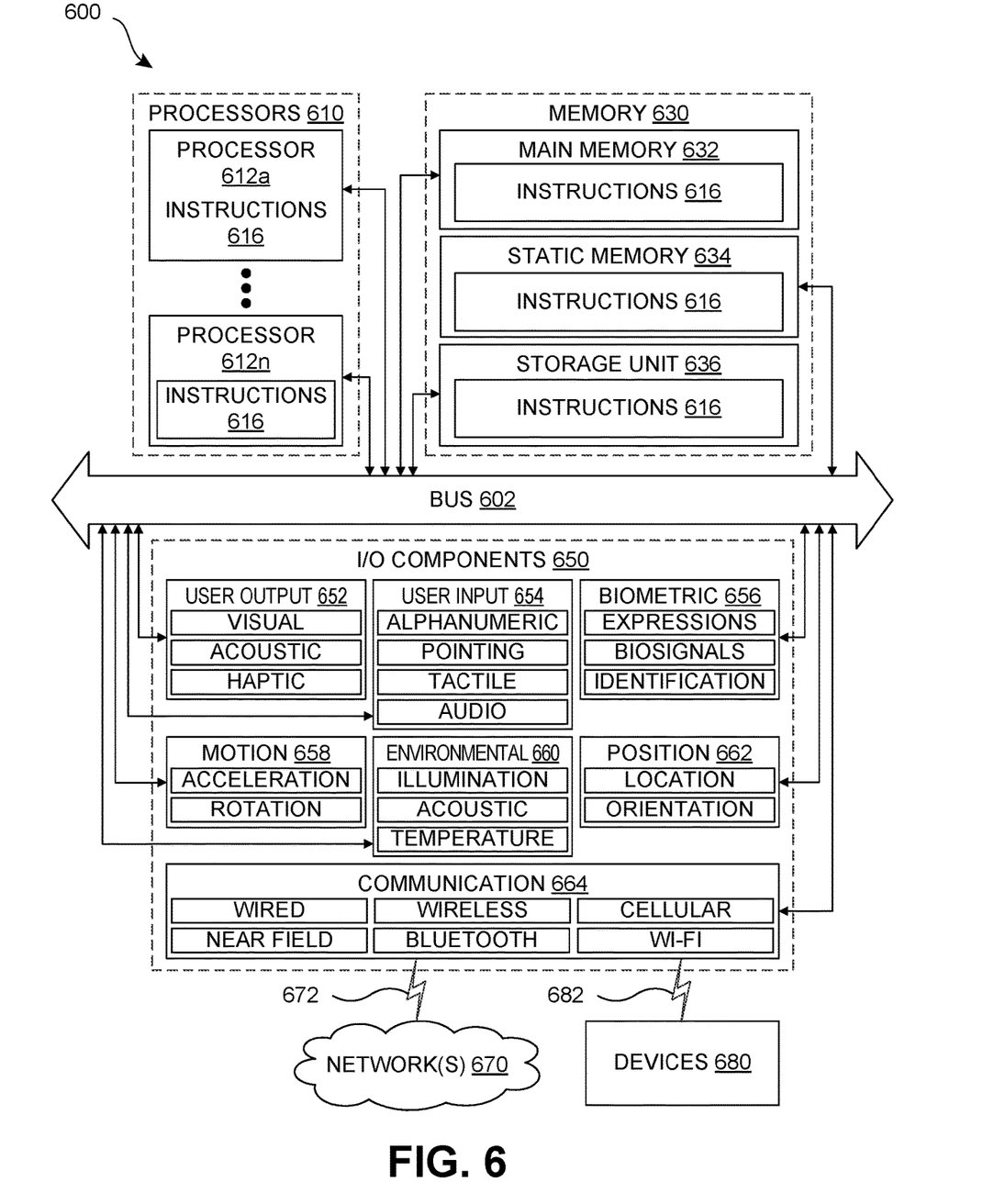
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system (e.g., a programmable device), within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IOT) device. Further, although only a single machine 600 is illustrated, the term "machine" includes a collection of machines that individually or jointly execute the instructions 616.

The machine 600 may include processors 610, storage 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A device comprising:
a processor; and
a memory in communication with the processor, the memory storing executable instructions that, when executed by the processor, cause the device to perform functions of:
generating a session key for a communication session between the device and a resource server;
deriving a nonce from the session key;
transmitting a request to an identity platform to authenticate the device for accessing the resource server, the request including the nonce;
upon confirmation of authentication, receiving an access token from the identity platform, the access token including information that confirms authentication of the device; and
transmitting the access token to the resource server to enable access to the resource server,
wherein the access token includes the nonce.

Item 2. The device of item 1, wherein the resource server is a virtual private network (VPN).

Item 3. The device of items 1 or 2, wherein the access token includes information identifying the device.

Item 4. The device of any one of the preceding items, wherein the access token includes information confirming that the device is an authorized device.

Item 5. The device of any one of the preceding items, wherein the access token includes information confirming that the device complies with one or more conditional access policies of the resource server.

Item 6. The device of any one of the preceding items, wherein the executable instructions when executed by the processor further cause the device to perform functions of:
  transmitting a first part of the session key to the resource server;
  receiving a second part of the session key from the resource server;
  generating the session key from the first part and the second part of the session key; and
  transmitting the nonce to the identity platform.
Item 7. The device of any one of the preceding items, wherein the nonce is derived from the session key by generating a hash of the session key.
Item 8. A method for generating an access token for providing access to a resource server, the method comprising:
  receiving a request from a device to provide an access token to the device, the access token for use in accessing the resource server, the request including a nonce derived from a session key generated for a communication session between the device and the resource server;
  determining if the device is authorized to access the resource server;
  responsive to determining that the device is authorized to access the resource server, generating the access token;
  including the nonce in the access token; and
  transmitting the access token to the device.
Item 9. The method of item 8, further comprising:
  determining if the resource server requires compliance with one or more conditional access policies;
  upon determining that the resource server requires compliance with the one or more conditional access policies, verifying that the device complies with the one or more conditional access policies, and
  including information in the access token that provides confirmation that the device the device complies with the one or more conditional access policies.
Item 10. The method of item 9, wherein verifying that the device complies with the one or more conditional access policies includes:
  transmitting a request to at least one of the device or a device management provider for the device to provide one or more device states relating to the one or more conditional access policies;
  receiving the one or more device states; and
  comparing the one or more device states to the one or more conditional access policies to verify if the one or more device states comply with the one or more conditional access policies.
Item 11. The method of any one of items 8-10, wherein the access token includes information identifying the device.
Item 12. The method of any one of items 8-11, wherein the access token includes information confirming that the device is an authorized device.
Item 13. The method of any one of items 8-12, further comprising:
  upon receiving the request from a device, determining whether a valid access token for the device is available; and
  responsive to determining that the valid access token for the device is available, transmitting the valid access token to the device.
Item 14. A non-transitory computer readable medium on which are stored instructions that when executed cause a programmable device to:
  generate a session key for a communication session between the programmable device and a resource server;
  deriving a nonce from the session key;
  transmit a request to an identity platform to authenticate the programmable device for accessing the resource server, the request including the nonce;
  upon confirmation of authentication, receive an access token from the identity platform, the access token including information that confirms authentication of the programmable device; and
  transmit the access token to the resource server to enable access to the resource server,
  wherein the access token includes the nonce.
Item 15. The non-transitory computer readable medium of item 14, wherein the resource server is a virtual private network (VPN).
Item 16. The non-transitory computer readable medium of items 14 or 15, wherein the access token includes information identifying the programmable device.
Item 17. The non-transitory computer readable medium of any one of items 14-16, wherein the access token includes information confirming that the programmable device is an authorized device.
Item 18. The non-transitory computer readable medium of any one of items 14-17, wherein the access token includes information confirming that the programmable device complies with one or more conditional access policies of the resource server.
Item 19. The non-transitory computer readable medium of any one of items 14-18, wherein the instructions further cause a programmable device to:
  transmit a first part of the session key to the resource server;
  receive a second part of the session key from the resource server;
  generate a second key from the first part and the second part of the session key;
  derive a nonce from the session key; and
  transmit the nonce to the identity platform.
Item 20. The non-transitory computer readable medium of any one of items 14-19, wherein the nonce is derived from the session key by generating a hash of the session key.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method for providing access by a device to a resource server, the method comprising:
   transmitting a first part of a master session key to the resource server;
   responsive to transmitting the first part of the master session key to the resource server, receiving a second part of the master session key from the resource server;
   generating, using a resource client software application installed on the device, from the first part and the second part of the master session key, the master session key for a communication session between the device and the resource server;
   transmitting, from the device to an identity platform, an authentication request for providing an access token for use by the device in accessing the resource server for the communication session between the device and the resource server, the authentication request including a nonce derived using the resource client software application installed on the device, the nonce derived from the master session key by generating a hash of the master session key;
   determining if the resource server requires compliance with one or more conditional access policies;
   upon determining that the resource server requires compliance with the one or more conditional access policies, transmitting information to the identity platform that verifies that the device complies with the one or more conditional access policies, and
   responsive to transmitting the authentication request, receiving the access token from the identity platform, the access token including the nonce and the access token including information that provides confirmation that the device complies with the one or more conditional access policies.

2. The method of claim 1, wherein transmitting information to the identity platform that verifies that the device complies with the one or more conditional access policies includes:
   receiving a request at the device or a device management provider to provide one or more device states relating to the one or more conditional access policies; and
   transmitting the one or more device states to the identity platform,
   wherein the identity platform compares the one or more device states to the one or more conditional access policies to verify if the one or more device states comply with the one or more conditional access policies.

3. The method of claim 1, wherein the access token includes information identifying the device.

4. The method of claim 1, wherein the access token includes information confirming that the device is an authorized device.

5. The method of claim 1, wherein the identity platform determines whether a valid access token for the device is available and responsive to determining that the valid access token for the device is available, transmits the valid access token to the device.

6. The method of claim 1, wherein the information that provides confirmation that the device complies with the one or more conditional access policies includes one or more device states relating to the one or more conditional access policies.

7. A machine-readable medium on which are stored instructions that when executed cause a programmable device to:
   transmit a first part of a master session key to a resource server;
   responsive to transmitting the first part of the master session key to the resource server, receive a second part of the master session key from the resource server;
   generate, using a resource client software application installed on the programmable device, from the first part and the second part of the master session key, the master session key for a communication session between the programmable device and the resource server,
   derive, using the resource client software application installed on the programmable device, a nonce from the generated master session key, by generating a hash of the master session key;
   upon deriving the nonce, transmit, from the device to an identity platform, the nonce in an authentication request for authenticating the programmable device for accessing the resource server;

receive, from the identity platform, an access token that includes the nonce and includes information that confirms authentication of the programmable device;

transmit the access token to the resource server; and upon transmitting the access token to the resource server, receiving access to the resource server;

wherein the access token includes information confirming that the programmable device complies with one or more conditional access policies of the resource server.

8. The machine-readable medium of claim 7, wherein the nonce is derived from the session key by generating a hash of the session key.

9. The machine-readable medium of claim 7, wherein the authentication request to the identity platform includes information verifies that the device complies with the one or more conditional access policies.

10. The machine-readable medium of claim 9, wherein the information that verifies that the device complies with the one or more conditional access policies includes one or more device states relating to the one or more conditional access policies.

11. The machine-readable medium of claim 7, wherein the information confirming that the programmable device complies with the one or more conditional access policies of the resource server is included in the access token by checking a flag in the access token.

12. The machine-readable medium of claim 7, wherein the access token includes a claim that provides an indication that the programmable device complies with the one or more conditional access policies of the resource server.

13. A device comprising:

a processor; and a memory in communication with the processor, the memory storing executable instructions that, when executed by the processor, cause the device to perform steps of:

transmitting a first part of a master session key to a resource server;

responsive to transmitting the first part of the master session key to the resource server, receiving a second part of the master session key from the resource server;

generating, using a resource client software application installed on the device, from the first part and the second part of the master session key, the master session key for a communication session between the device and the resource server;

deriving, using the resource client software application installed on the device, a nonce from the generated master session key, by generating a hash of the master session key;

upon deriving the nonce, transmitting, from the device to an identity platform, the nonce in an authentication request for authenticating the device for accessing the resource server;

determining if the resource server requires compliance with one or more conditional access policies;

upon determining that the resource server requires compliance with the one or more conditional access policies, transmitting information to the identity platform that verifies that the device complies with the one or more conditional access policies;

responsive to transmitting the authentication request, receiving, from the identity platform, an access token that includes the nonce, includes information that confirms authentication of the device and includes information that provides confirmation that the device complies with the one or more conditional access policies;

transmitting the access token to the resource server; and upon transmitting the access token to the resource server, receiving access to the resource server.

14. The device of claim 13, wherein the resource server is a virtual private network (VPN).

15. The device of claim 13, wherein the access token includes information identifying the device.

16. The device of claim 13, wherein the access token includes information confirming that the device is an authorized device.

17. The device of claim 13, wherein the information that provides confirmation that the device complies with the one or more conditional access policies includes one or more device states relating to the one or more conditional access policies.

18. The device of claim 17, wherein the one or more device states include at least one of a device operation system and whether the device has been jailbroken.

19. The device of claim 13, wherein the information confirming that the device complies with the one or more conditional access policies of the resource server is included in the access token by checking a flag in the access token.

20. The device of claim 13, wherein the access token includes a claim that provides an indication that the device complies with the one or more conditional access policies of the resource server.

* * * * *